United States Patent [19]

Fendley

[11] Patent Number: 4,688,079
[45] Date of Patent: Aug. 18, 1987

[54] COLOR CRT PURITY MEASUREMENT

[75] Inventor: James R. Fendley, Arlington Heights, Ill.

[73] Assignee: Zenith Electronics Corporation, Glenview, Ill.

[21] Appl. No.: 893,420

[22] Filed: Aug. 5, 1986

[51] Int. Cl.[4] .............................................. H04N 17/04
[52] U.S. Cl. ....................................... 358/10; 358/139
[58] Field of Search .................. 358/10, 139; 315/368, 315/369; 313/409, 412

[56] References Cited

U.S. PATENT DOCUMENTS

| 4,201,932 | 5/1980 | Smith | 358/10 |
| 4,439,735 | 3/1984 | Alvite | 358/10 |
| 4,642,529 | 2/1987 | Penn | 358/10 |

Primary Examiner—Michael A. Masinick
Attorney, Agent, or Firm—Cornelius J. O'Connor; Thomas E. Hill

[57] ABSTRACT

In a color cathode ray tube (CRT) having three electron beams each incident upon a respective primary color phosphor dot of red, green or blue, wherein the color dots are arranged in spaced, periodic groups of three dots, color purity which is determined by the accuracy with which each electron beam impacts its associated phosphor dots is measured by an adaptive process which measures six electron beam deflection vectors from which a beam landing calibration vector may be determined to correct for electron beam misalignment. After measuring beam landing error for each of the three electron beams, the center electron beam is deflected either right or left as determined by its previously measured beam landing error to the nearer of the two remaining dots. The electron beam associated with the remaining dot is then laterally displaced to the center dot. The center electron beam is then deflected either upward or downward to an adjacent dot of one of the two other colors in an immediately adjacent row to provide a sixth deflection vector. The known periodicity of the phosphor dots together with light intensity measurements permit the six deflection vectors to be used to calculate a calibration vector in terms of deflection units (distance) per unit of magnetic deflection coil current for accurate positioning of each electron beam upon its respective color dots for improved lens design or magnetic yoke deflection corrections and enhanced video image color purity.

15 Claims, 8 Drawing Figures

COLOR CRT PURITY MEASUREMENT

BACKGROUND OF THE INVENTION

This invention relates generally to cathode ray tubes (CRTs) of the shadow mask type and is particularly directed to the measurement of electron beam landing errors of the type which cause degradation in color purity.

CRTs such as those used in television receivers and computer terminals are generally provided with a plurality of luminescent elements deposited upon the inner surface of the CRT's faceplate upon which a video image is displayed. Impingement of energetic electrons upon the luminescent elements, which are commonly termed "phosphor dots", results in light output from these luminescent elements. Near simultaneous illumination of large numbers of phosphor dots in a predetermined array results in the display upon the CRT's faceplate of a desired alphanumeric character or graphic image. Positioned immediately adjacent to the faceplate and within the CRT is a structure generally termed a "shadow mask" having a large number of apertures therein through which the energetic electrons transit as they are directed toward impact with the phosphor dots. In a color CRT, wherein three electron guns are positioned in close proximity to one another in the neck or rear portion of the CRT, each aperture of the shadow mask corresponds with a trio of phosphor dots on the faceplate which respectively emit red, green and blue light, the primary colors, when struck by energetic electrons. Each aperture in the shadow mask is aligned with the three electron guns and the three associated, grouped phosphor dots to permit only electrons from the red electron gun to be incident upon red phosphor dots. Similarly, electrons from the green electron gun illuminate green phosphor dots and the blue electron gun illuminates blue phosphor dots.

In order to avoid deleterious moire effects, a scanning electron beam from any one of the three primary color guns must simultaneously illuminate several dots of the appropriate color. If the green gun (usually the center gun in an in-line configuration) illuminates red or blue dots, a color contamination or loss of "purity" is said to result. Similar purity errors may occur with the other two primary colors.

Short of the condition in which, for example, the green gun illuminates portions of blue dots, a less serious "negative" beam landing error involving a loss of brightness occurs when an electron exiting a shadow mask aperture lands eccentric with respect to its associated phosphor dot. So called "negative guard band" color CRTs now in common use are designed such that electron beam cross section exceeds phosphor dot area. A portion of each electron beam is thus by design incident upon the non-luminescent guard region which surrounds each phosphor dot. The guard band is typically comprised of a graphite coating known as "black surround". A "positive" purity error occurs whenever the beam from an electron gun of a certain color illuminates the phosphor dot of another color. Frequently small beam landing errors in such negative guard band CRTs are imperceptible, even with microscope-aided visual detectors. For example, a slightly eccentric electron beam may fully illuminate its corresponding phosphor dot. Therefore, the display system designer seeking to accurately measure and minimize electron beam landing errors must consider not only the beam landing error of each beam with respect to its corresponding dot, but also the positions of neighboring dots of the two other colors.

As has been mentioned a non-luminescent "grille", sometimes referred to as "black surround", is printed on the inner surface of the CRT's faceplate or wherever it is desired to eliminate a light output. This guard region or grille not only reduces beam landing error (purity degradation) effects, but also serves to absorb ambient light incident thereon in order to improve video display contrast. However, there is a practical limit to reducing phosphor dot size while increasing grille area in attempting to improve contrast. Typically, beam current is increased in order to compensate for this limitation, but this approach also suffers from limitations as evidenced in loss of video image resolution.

Systematic electron beam landing or color purity errors may be minimized by proper design and fabrication of the lighthouse lens used in color CRT manufacture. This aspheric lens corrects for differences between light-optical ray trajectories involved in photo-chemical screen printing and electron-optical trajectories associated with the final product. An iterative process is used for lighthouse lens design, wherein with each iteration a reduction of beam landing errors is realized only if the lens designer has precise knowledge of previously measured purity errors.

U.S. Pat. No. 4,439,735 to Alvite et al, assigned to the assignee of the present application, discloses a method and apparatus for testing a line screen CRT for misregistration between its electron beam and the beam's phosphor stripe targets involving the sensing of light output at a plurality of test areas on the CRT screen as the electron beam is stepped across its phosphor stripe targets. The maximum and minimum light outputs of each test area as well as the beam locations at which the maximum and minimum light outputs were measured are used to compute the extent of electron beam misregistration with associated phosphor stripe targets for each test area on the CRT screen.

The present invention provides precise beam landing information to the CRT designer for accurate measurement and correction of beam landing errors in a system and method which allows for precisely controlled beam landing changes and accurate measurement of the resulting changes in light intensity. Beam landing data for the three primary colors is obtained in a matter of seconds in a self-calibrating, automatic system and method wherein the electron beam deflection current required to maximize brightness and minimize beam landing error on each axis is measured and corrected for optimum color purity.

OBJECT OF THE INVENTION

Accordingly, it is an object of the present invention to provide improved color purity in a CRT.

It is another object of the present invention to provide an accurate, fast and inexpensive means and method of measuring electron beam landing errors in a color CRT.

A further object of the present invention is to provide an electronic, computer-controlled arrangement for measuring color purity in a multi-electron beam CRT display which eliminates the requirements of mechanical adjustment, human observation, or electron beam synchronization or yoke deflection manipulation.

Still another object of the present invention is to provide for the accurate measurement of electron beam landing errors whether of the nearly imperceptible type corresponding to loss of guard band, i.e., "negative purity" errors, or of the more significant type resulting in color contamination, i.e., "positive purity" errors.

A still further object of the present invention is to provide a method and means for measuring the position of electron beam incidence upon a CRT faceplate which is entirely up front, i.e., which requires no special components on the neck, yoke, or funnel portions of the CRT being tested.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
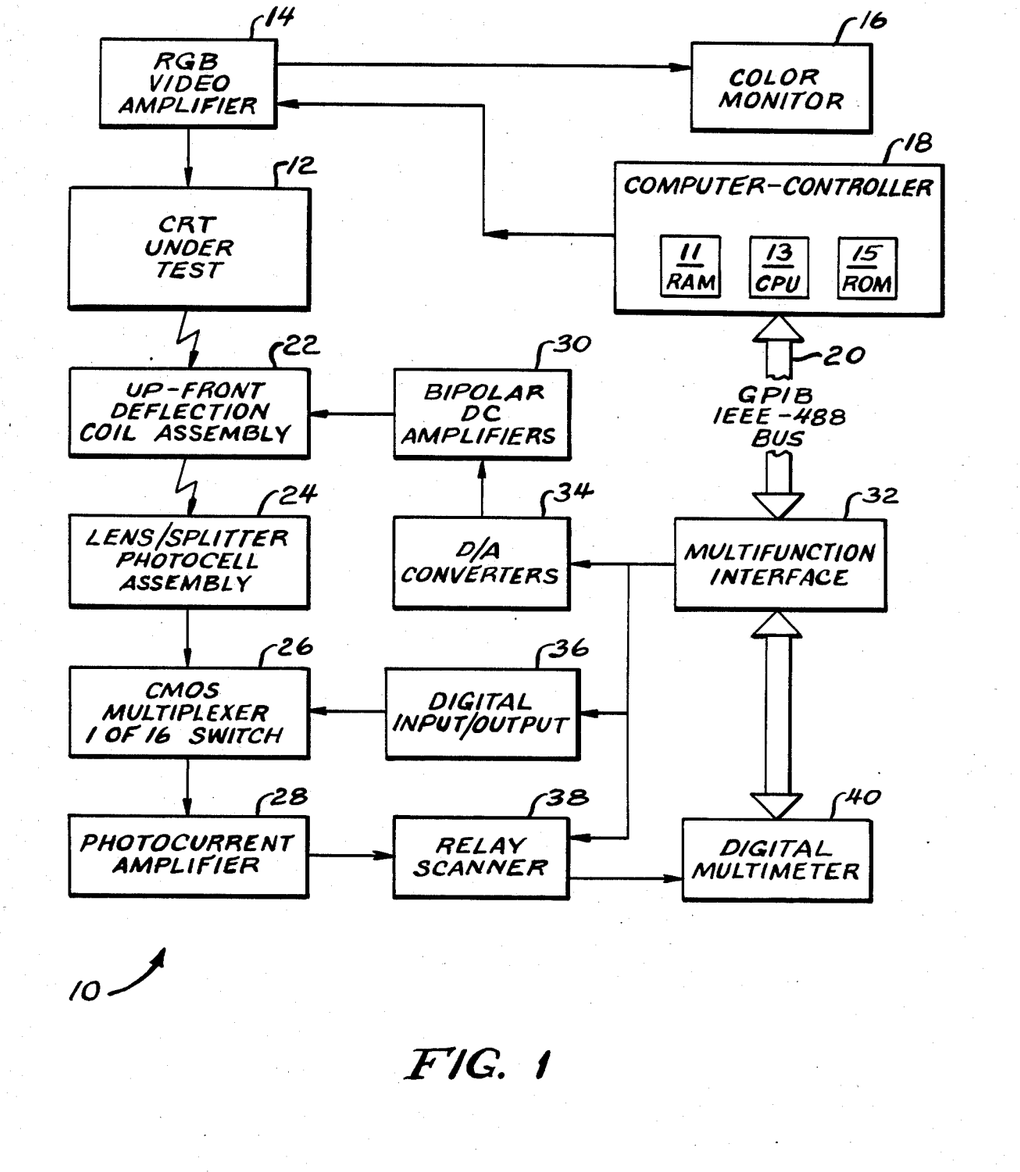
FIG. 1 is a simplified block diagram of color CRT purity measurement apparatus in accordance with the present invention.

Referring to FIG. 1, there is shown in block diagram form a color CRT purity measurement system 10 for measuring the color purity of the display on a multi-electron beam CRT 12 under test. The color purity measurement system 10 includes a computer-controller 18 which is coupled to and provides control signals to a red-green-blue (RGB) video amplifier 14 which selects which of the three primary color electron guns is active for measuring color purity. The RGB video amplifier 14 is coupled to and provides appropriate control signals to the CRT 12 under test for energizing only one of the three electron beams in the CRT at a time. In a typical test arrangement, appropriate control signals are provided by the computer-controller 18 to the RGB video amplifier 14 for sequentially cycling through each of the three primary color electron beams in the CRT 12 in measuring the respective color purities of each. The RGB video amplifier 14 provides identical control signals to the CRT 12 under test as well as to the color monitor 16 to permit video display of the color purity measurements of the CRT on the color monitor as described below.

The computer-controller 18 used in a preferred embodiment is a Z-100 microcomputer available from Zenith Data Systems equipped with a Pickles and Trout model P & T-488 interface card. This card permits control of instruments connected to a general purpose interface bus (GPIB) following IEEE-488 standards. The microcomputer-controller 12 includes, among other components, a central processor unit (CPU) 13, a read only memory (ROM) 15, and a program random access memory (RAM) 11. The computer-controller 18 further includes an arithmetic-logic unit and a control section (not shown) which, in combination, execute various operating instructions, control the flow of data, make decisions based upon system tests and the detection of various system parameters, temporarily store data, and perform logic and arithmetic functions. The ROM 15 is used to store a dedicated program in firmware form and numbers or constants which are needed during execution of the aforementioned program. The program RAM 11 is a read/write memory which stores data for use during program execution and from which data may be read by the CPU 13 for processing therein as the computer-controller 18 exercises control over the color purity measurement system 10.

Up-front electron beam deflection coils 22, or "wobulator" coils, are positioned immediately adjacent to the faceplate of the CRT 12 under test for precisely controlling deflection of the electron beams in accordance with the operating program stored within the computer-controller's RAM 11. Light from the phosphor dots positioned on the CRT's faceplate generated by electrons incident thereon is transmitted through the deflection coil assembly 22 to a lens/splitter photocell assembly 24. The lens/splitter photocell assembly 24 is comprised of a plurality of paired beam splitters and photodetectors, with each pair responsive to one of the primary colors for detecting illuminated phosphor dots on the CRT's faceplate. A lens/splitter photocell assembly 24 for use in a preferred embodiment of the present invention is illustrated in FIG. 3, while up-front deflection coils 22 for use in the present invention are illustrated in FIG. 4, with both arrangements described in detail below.

A multifunction interface unit 32 is coupled to the computer-controller 18 via the GPIB bus 20. The multifunction interface unit 32 used in a preferred embodiment is comprised of a Tektronix TM5006/MI5010 interface unit and provides digital control signals to digital-to-analog (D/A) converters 34. The D/A converters 34 convert these digital signals to bipolar analog signals which are provided to bipolar DC amplifiers 30 which, in turn, are coupled to and provide control signals to the up-front deflection coils 22. The bipolar DC amplifiers 30 amplify the analog output from the D/A converters 34 to an 8 volt, 250 milliamp level which is required for proper control of the magnetic field generated by each pair of up-front deflection coils 22 as described below. In response to detection of phosphor dot light intensity by the lens/splitter photocell assembly 24, various signals representing positioning accuracy of each of the three electron beams relative to its corresponding set of phosphor dots, or the color purity of the CRT, are provided from the photocell assembly to a CMOS multiplexer 26. Control signals are provided from the multifunction interface 32 via a digital input/output circuit 36 to the CMOS multiplexer 26 for selecting among the three primary color photocells within the lens/splitter photocell assembly 24. By monitoring one photocell within the lens/splitter photocell assembly 24 at a time, positioning accuracy of each of the primary color electron beams relative to its respective phosphor dots may be accurately detected and measured. The measured results of phosphor dot illumination by each of the primary color electron beams in sequence is provided from the CMOS multiplexer 26 to a photocurrent amplifier 28 which amplifies the received optical signals to on the order of 1 volt. The output of the photocurrent amplifier 28 is provided via a relay scanner 38 to a digital multimeter 40. The relay scanner 38 is responsive to control inputs from the multifunction interface 32 and provides various output signals to the digital multimeter 40 to permit the digital multimeter to be switched among various functions by the operating program stored in the computer-controller's RAM 11. The digital input/output circuit 36 provides control bits to the CMOS multiplexer 26 for determining whether the red, green or blue photocell signals are routed to the digital multimeter 40. The digital multimeter 40 converts the analog photocell current signals to digital signals for processing within the computer-controller 18. The relay scanner 38 permits the CRT test system digital multimeter 40 to be used in the color CRT purity measurement system 10 of the present invention in generating digital signals representing the red, green and blue photocell current signals.

Figure 2:
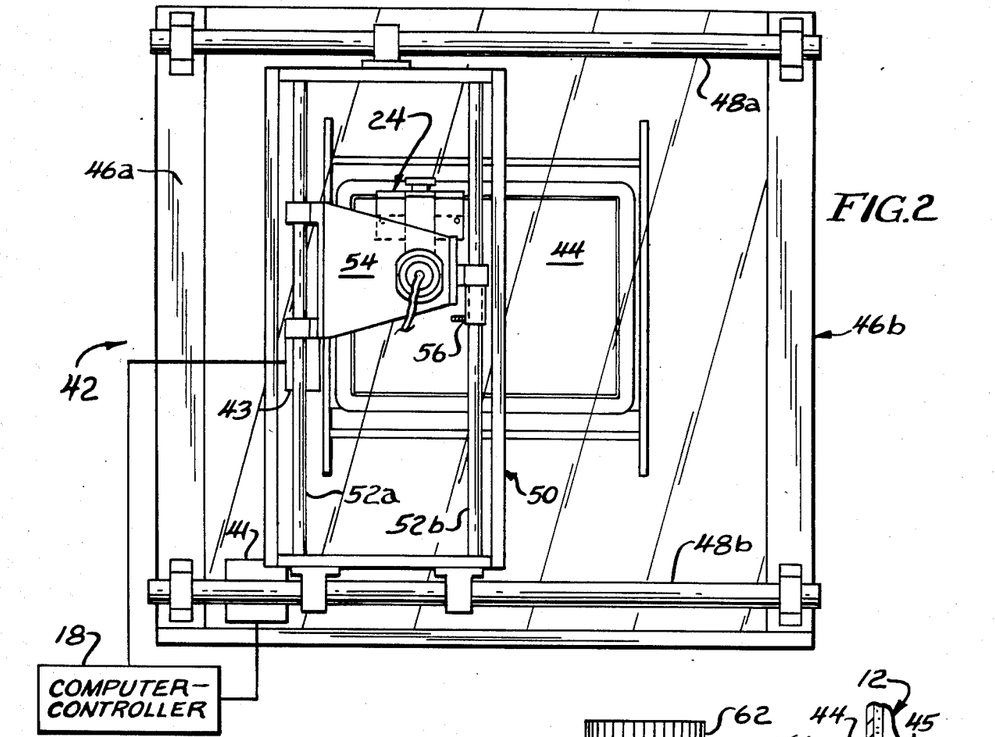
FIG. 2 is a plan view of an arrangement for positioning a multi-color photodetector assembly with respect to the faceplate of a CRT undergoing color purity measurement in accordance with the present invention.

Referring to FIG. 2, there is shown a vertical plan view of a support/displacement frame 42 for positioning the photocell assembly 24 immediately adjacent to the faceplate 44 of a CRT under test. The support/displacement frame 42 includes a pair of generally vertical frame members 46a, 46b as well as upper and lower generally horizontal support bars 48a, 48b. The aforementioned vertical frame members and horizontal support bars form a generally closed, rectangular structure for supporting a movable frame 50. The movable frame 50 includes vertical support bars 52a, 52b which are coupled to and movable along the horizontal support bars 48a, 48b. Positioned between and supported by the vertical support bars 52a, 52b is a mounting bracket 54 to which is securely coupled the lens/splitter photocell assembly 24. The mounting bracket 54 is movable along the vertical support bars 52a, 52b and is securely maintained in position thereon by means of the combination of a clamp with a set screw 56. The combination of the mounting bracket 54 and photocell assembly 24 may thus be displaced vertically and horizontally across the faceplate 44 of the CRT under test. First and second drive means 41, 43 may be respectively coupled to the movable frame 50 and to the mounting bracket 54 for horizontally and vertically displacing the photocell assembly 24 relative to the CRT's faceplate 44. The first and second drive means 41, 43 may be coupled to the computer-controller 18 for automatic displacement and positioning of the photocell assembly 24 relative to the CRT faceplate 44 for automatically measuring color purity over various portions of the faceplate. The first and second drive means 41, 43 may be conventional in design and operation and may, for example, include an electric motor in combination with a drive shaft and roller for displacing the movable frame and mounting bracket within the support/displacement frame 42. Provision may also be made for moving the photocell assembly 24 manually across the CRT faceplate 44. In either case, positioning of the photocell assembly 24 immediately adjacent to various portions of the CRT faceplate 44 permits CRT color purity to be measured at various locations on its faceplate.

Figure 3:
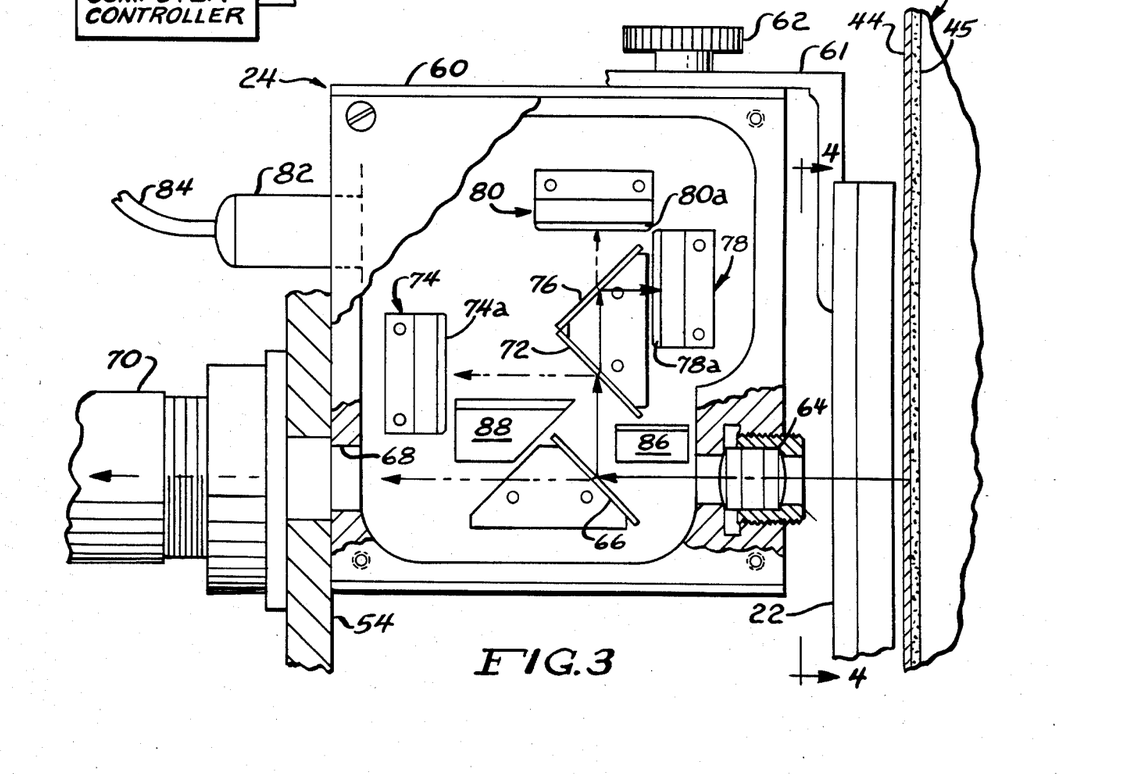
FIG. 3 is a partially cutaway lateral sectional view of a multi-color photodetector assembly for use in the color purity measurement apparatus of the present invention.
Figure 4:
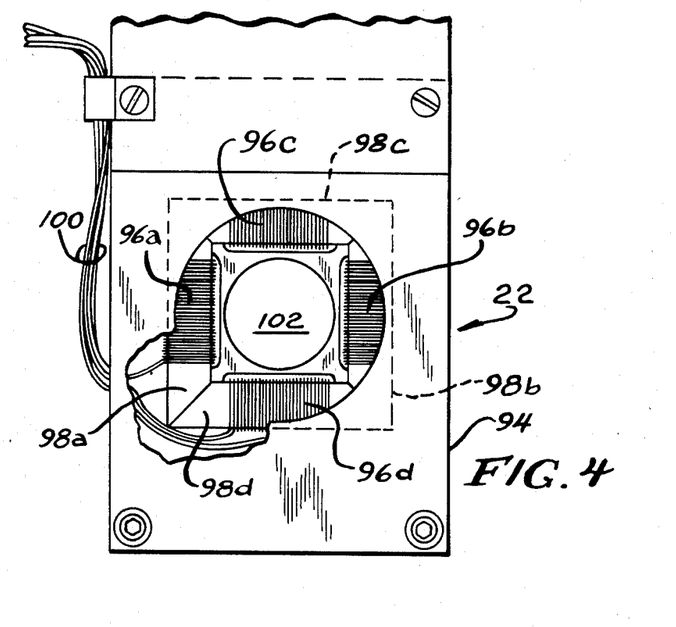
FIG. 4 is a partially cutaway front view of a "wobulator" coil arrangement for deflecting electron beams in measuring the color purity of a CRT in accordance with the principles of the present invention.

Referring to FIG. 3, there is shown a partially cut-away lateral view of a lens/splitter photocell assembly 24 for use in the color CRT purity measurement system of the present invention. The photocell assembly 24 includes a generally rectangular, closed housing 60 which is coupled to the support/displacement frame of 54 FIG. 2 by conventional means which, for simplicity, is not shown in the figure and is maintained in position immediately adjacent to the faceplate 44 of a CRT 12. Positioned intermediate the photocell housing 60 and CRT faceplate 44 and mounted to a forward portion of the housing by means of the combination of a mounting bracket 61 and threaded coupler 62 is the up-front deflection coil assembly 22. Light from illuminated phosphor dots in a phosphor layer 45 disposed on the inner surface of the CRT's faceplate 44 transits the up-front deflection coil assembly 22 and is incident upon an achromatic triplet lens assembly 64 positioned in an aperture in a forward portion of the photocell housing 60. Light from the CRT 12 transits the lens 64 and is incident upon a neutral beamsplitter 66 which transmits abou half of the incident visible light to a convergence detection port 68 to allow for convergence measurement of the CRT electron beams. A convergence measurement arrangement generally shown as element 70 in FIG. 3 for simplicity is described in detail in Applicant's co-pending patent application entitled "CRT Color Convergence Measurement", Ser. No. 808,302, filed Dec. 11, 1985, in the name of the present inventor, and assigned to the assignee of the instant application.

The remaining portion of the incident light from the CRT's faceplate 44 is directed by the neutral beamsplitter 66 to a blue beamsplitter 72 which directs the blue component of the incident light onto a blue detector 74. The blue beam splitter 72 allows the remaining non-blue portion of the incident light from the CRT to travel to a red beamsplitter 76. The red beamsplitter 76 reflects the red portion of the incident light onto a red detector 78 and allows the remaining portion of the incident light to travel to a green detector 80. In this manner, each of the primary color components of the light emitted from the CRT faceplate 44 may be isolated and individually detected The blue detector includes a blue transmitting filter glass 74a which absorbs red and green light to provide improved color separation over that available by means of a subtractive filter. The red and green detectors 78, 80 are also provided with a red transmitting filter glass 78a and a green transmitting filter glass 80a, respectively, for improved color separation and isolation beyond that provided by the aforementioned color beam splitters or subtractive filters. Each of the three color detectors in a preferred embodiment is a silicon photovoltaic cell with an active area of approximately 10 millimeters in diameter. The magnification is fixed at approximately 2.5, providing a field of view on the CRT faceplate of 4 millimeters in diameter.

First and second baffles 86, 88 are positioned between the aspheric lens 64 and the blue detector 74 to prevent light transmitted by the lens from being directly incident upon the blue detector without first being reflected by the neutral beamsplitter 66 and the blue beamsplitter 72. A connector 82 in the the photocell housing 60 permits a multi-lead conductor 84 to be coupled to the various aforementioned color detectors within the housing. The conductor 84 couples the lens/splitter photocell assembly 24 to the CMOS multiplexer 26 as described earlier with respect to FIG. 1 for measurement and analysis of the various detected color signals by the color CRT purity measurement system of the present invention.

Referring to FIG. 4, there is shown a partially cutaway plan view of an up-front deflection coil assembly 22 for use in the present invention. The deflection coil assembly coil 22, also known as wobulator coils, includes a mounting plate 94 for securely mounting the deflection coil assembly to the lens/splitter photocell assembly 24 as described above. The deflection coil assembly 22 further includes left and right deflection coils 96a, 96b and top and bottom deflection coils 96c, 96d. The left and right deflection coils 96a, 96b are respectively wound around left and right ferrite cores 98a, 98b. Similarly, the top and bottom deflection coils 96c, 96d are respectively wound around top and bottom ferrite cores 98c, 98d. The combination of the top and bottom deflection coils and ferrite cores establish a generally horizontally oriented magnetic field for deflecting an electron beam incident upon the CRT's faceplate in a generally vertical direction either upward or downward. Similarly, the combination of the left and right deflection coils and ferrite cores establish a generally vertically aligned magnetic field for deflecting an electron beam horizontally either rightward or leftward. The deflection coil assembly 22 includes a generally circular aperture 102 in a center portion thereof and disposed between facing left and right and top and bottom deflection coils. Light from phosphor dots illuminated by an electron beam incident thereon is transmitted from the CRT's faceplate via the deflection coil assembly's aperture 102 to the photocell assembly 24 as described above. A plurality of electrical leads 100 couple each of the aforementioned left and right and top and bottom deflection coils to the bipolar DC amplifiers 30 as described with respect to FIG. 1 for receiving electron beam deflection signals from the computer-controller 18 in accordance with the operating program stored in its RAM 11. It is by means of the precise control exercised over the location of electron beam incidence upon the CRT's faceplate and simultaneous measurement of light emitted by the illuminated phosphor dots that the present invention is capable of accurately measuring color purity in a multi-electron beam CRT as described in the following paragraphs.

The measurement of color purity errors is complicated by the very desirable feature of a guard band disposed about the individual phosphor dots on the CRT's faceplate which provides isolation between the individual phosphor dots and reduces the visible effect of electron beam misalignment. The goal of the CRT designer in optimizing the video image presented on the CRT is to ensure that small, unavoidable electron beam landing errors are imperceptible to a viewer. The present invention provides for the measurement of beam landing errors and the eventual optimization of the resulting video image by precisely controlling the location of incidence of the electron beams upon the CRT's faceplate and measuring the resulting changes in light intensity thereon. The present invention varies electron beam landing patterns by changing the current within the various coils in the up-front deflection coil assembly 22 positioned adjacent to the CRT's faceplate. The deflection current required to maximize video image brightness on the CRT's faceplate is a measure along transverse horizontal and vertical axes of the amount of electron beam landing error. While there is not prior knowledge of the relationship between current change and beam landing variation, the present invention provides apparatus and method for precisely calibrating the up-front deflection coil assembl 22 by selectively moving beam landing locations of the various electron guns in a manner which minimizes errors due to deflection non-linearities and hysteresis effects within the deflection coils. By accurately calibrating changes in electron beam landing patterns with variations in deflection coil current, accurate beam landing positioning information may be derived to permit changes in phosphor dot patterns for optimizing color purity and improving video image quality.

Figure 5:
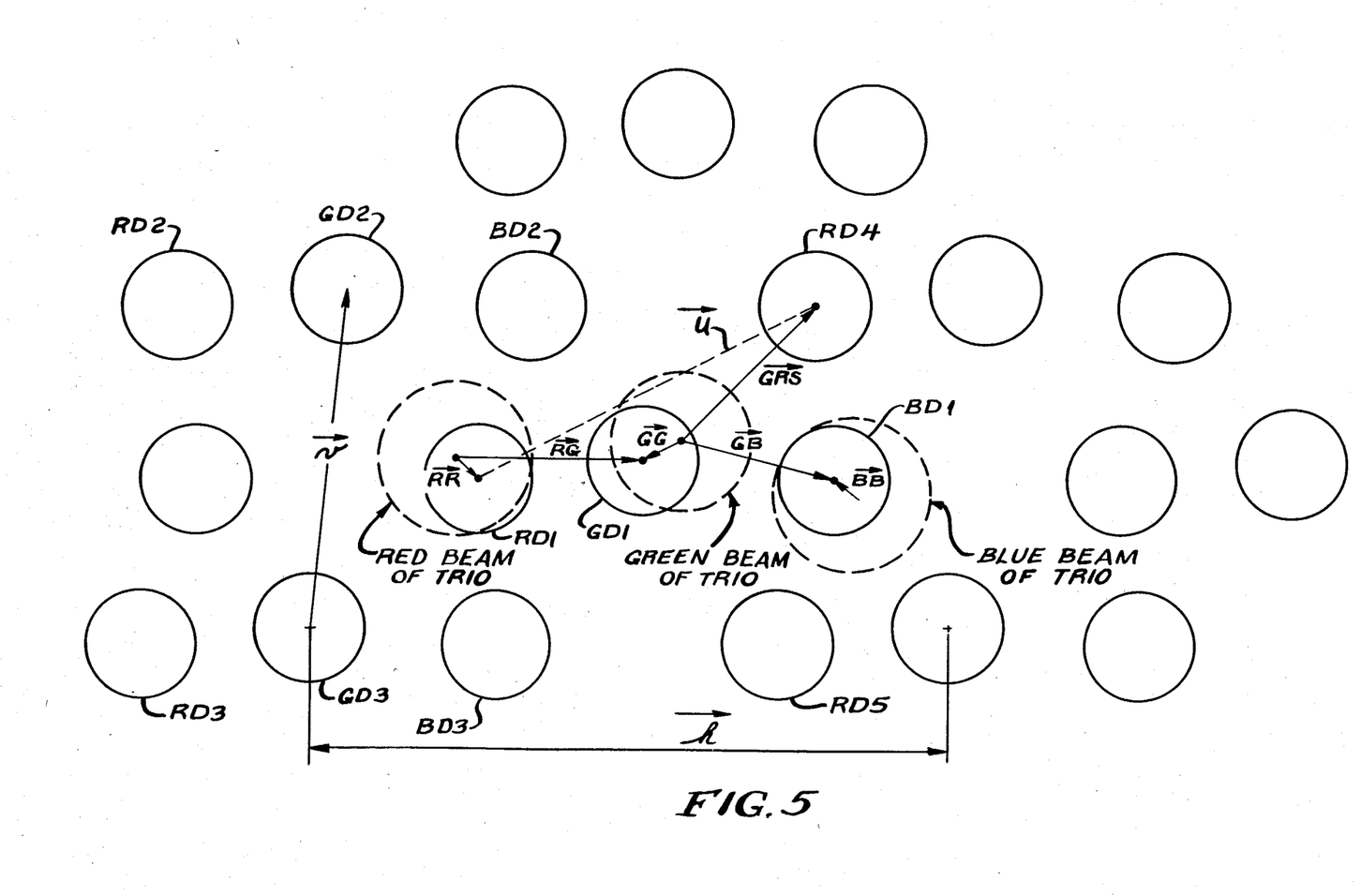
FIG. 5 illustrates the periodicity of the three grouped color dots on the faceplate of a color CRT and the various vectors generated in measuring the CRT's color purity in accordance with the present invention.
Figure 6:
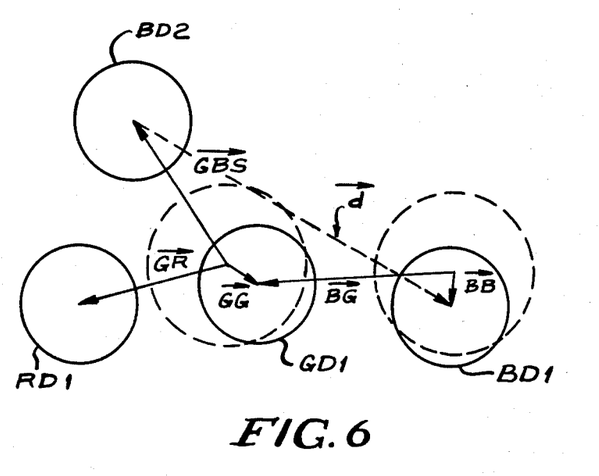
FIG. 6 illustrates the periodicity of color dots on the faceplate of a color CRT and the pattern repeat vector $\vec{d}$ used for calibration purposes in measuring CRT color purity in accordance with the present invention.
Figure 7:
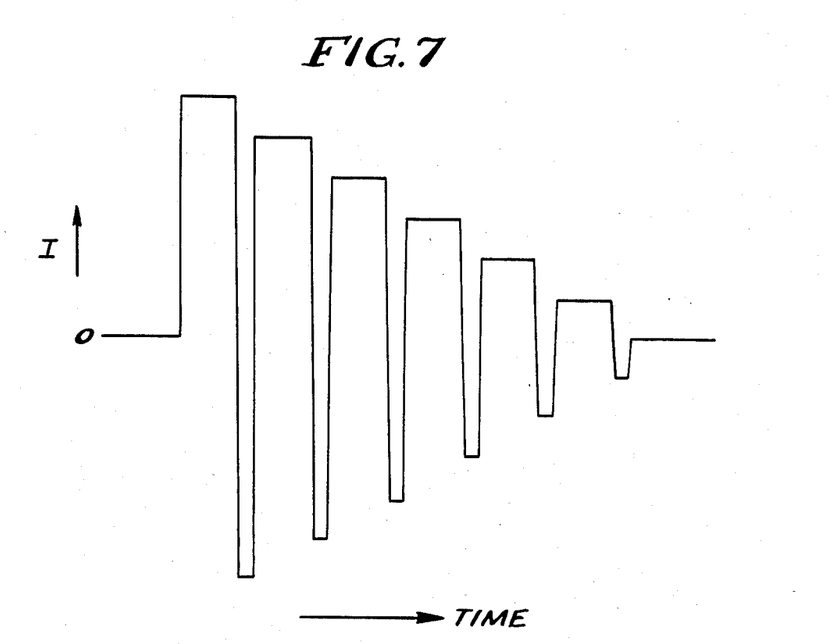
FIG. 7 illustrates the variation of electron beam deflection current with time for controlling the position of an electron beam in measuring CRT color purity.

Referring to FIGS. 5, 6 and 7, the manner in which color CRT purity is measured in accordance with the principles of the present invention will now be described. In a CRT with a graded shadow mask, the distance between adjacent phosphor dots on its faceplate is a function of position on the faceplate. Variation in inter-dot distances, however, is quite gradual and can be considered negligible for those phosphor dot trios within the (four millimeter) detection field of the photocell assembly 24 used in the present invention. Basis vectors of a two-dimensional repeating pattern can therefore be defined for describing the position of the phosphor dot trios.

Referring specifically to FIG. 5, there is illustrated a typical pattern of phosphor dot trios disposed on the faceplate of a CRT. Each phosphor dot trio includes a red dot (RD1), a green dot (GD1), and a blue dot (BD1). Corresponding dots in a second phosphor dot trio are designated as RD2, GD2 and BD2. The second phosphor dot trio is located upward and to the left of the first phosphor dot trio as shown in FIG. 5, while a third phosphor dot trio comprised of dots designated RD3, GD3 and BD3 is located to the left and downward with respect to the first phosphor dot trio.

A horizontal vector $\vec{h}$ and an approximately vertical vector $\vec{v}$ are selected as basis vectors in the following analysis. As shown in FIG. 5, horizontal translation by any integral multiple of $\vec{h}$ produces an equivalent location in terms of phosphor dot configuration. Similarly, vertical translation by any integral multiple of $\vec{v}$ reproduces the phosphor dot pattern. It should also be noted, as illustrated in FIG. 5, that the vector $$\vec{u} = \frac{\vec{h} + \vec{v}}{2} \tag{1}$$

reproduces the phosphor dot pattern, as does the vector $$\vec{d} = \frac{\vec{h} - \vec{v}}{2}. \tag{2}$$

The vectors $\vec{u}$ and $\vec{d}$ are also used in the calibration of the color CRT purity measurement apparatus and method as described in the following paragraphs.

Also shown in FIG. 5 with respect to the first phosphor dot trio are the locations of incidence of the three electron beams with respect to each of the phosphor dots on the CRT's faceplate. Thus, it can be seen that the red electron beam is centered upward and to the left of the red phosphor dot RD1, the green electron beam is centered upward and to the right of the green phosphor dot GD1, and the blue electron beam is centered below and to the right of the blue phosphor dot BD1.

The measurement of color purity in a given location on the CRT's faceplate requires essentially the finding of 12 deflection numbers corresponding to actual or interpolated light intensity maxima. These 12 measured quantities may be defined in terms of 6 two-dimensional vectors. Likewise, the final result calculated for each CRT faceplate location may be thought of in terms of 6 two-dimensional vectors. The 6 unknown vectors are provided in the following list:

1. Green beam landing error $(\vec{g_e})$;
2. Red beam landing error $(\vec{r_e})$;
3. Blue beam landing error $(\vec{b_e})$;
4. Red dot with respect to green dot $(\vec{r_d})$;
5. Blue dot with respect to green dot $(\vec{b_d})$; and
6. Calibration in terms of mils/deflection unit $(\vec{c})$.

The X and Y components of the first five vectors listed above may be expressed in mils. The two components of the calibration vector $\vec{c}$ are usually different, and vary with analog gain controls in the circuitry of digital-to-analog converters 34 and amplifiers 30. For most CRT faceplate phosphor dot configurations, somewhat less vertical deflection than horizontal deflection is required for a complete set of measurements.

The present invention makes use of an adaptive measurement procedure in order to minimize current within the deflection coils and to thus minimize errors arising from electron beam deflection non-linearities and deflection coil hysteresis effects. The present invention employs a "degaussing" type of electron beam sweep wherein deflection coil current is varied in a damped oscillating manner with time as illustrated in FIG. 7. Each positive current peak in FIG. 7 represents the current in a deflection coil employed to re-position an electron beam rightward in accordance with the procedure of the present invention. Each successive electron beam displacement is the result of decreasing deflection coil current as shown in the figure in order to minimize hysteresis effects in the deflection coil as an electron beam is moved from one location to another on the CRT's faceplate by means of the up-front deflection coil assembly 22. Deflection coil hysteresis effects are further reduced by the negative swing of the deflection current with each electron beam incremental deflection. From the figure it can also be seen that the positive current pulses are substantially longer in time than the negative current pulses as the electron beam is displaced in a damped oscillating manner. The longer time positive current pulses permit adequate time for light readings with the integrating type system digital multimeter 40 used in the present invention to provide for video display updating and provide settling time for the photocurrent amplifier 28 which amplifies the video output signals from the sensor/splitter photocell assembly 24 and provides these amplified signals to the digital multimeter. The integration time closely approaches the vertical sweep frequency of the CRT and is the equivalent of one power line cycle, i.e., 1/60 second (16.67 milliseconds). Therefore, after each displacement of an electron beam a light intensity measurement is made until the electron beam position corresponding to maximum intensity and optimum color purity is detected.

The first 3 aforementioned two-dimensional vectors are always first measured in terms of horizontal and vertical deflection units. These 3 vectors are illustrated in FIG. 5 and are as follows:

1. Green beam to green dot $(\overrightarrow{GG} = -\vec{g_e})$;
2. Red beam to red dot $(\overrightarrow{RR} = -\vec{r_e})$; and
3. Blue beam to blue dot $(\overrightarrow{BB} = -\vec{b_e})$.

The next step in carrying out color CRT purity measurements in accordance with the present invention involves an adaptive procedure wherein each subsequent step is dependent upon a previously measured parameter. In accordance with this procedure, if the light intensity detection data indicates that the green beam lands to the right of the green dot, as is the case illustrated in FIG. 5, the next step in the measurement procedure calls for the green beam to be deflected to the blue dot BD1 within the same phosphor dot trio or in the same row as that of the green phosphor dot GD1. On the other hand, if it is determined that the green beam is positioned to the left of the green dot GD1, the green beam is deflected leftward to the red dot RD1 within the same row. By thus adaptively displacing the green electron beam either rightward or leftward depending upon its position relative to its associated green dot GD1, deflection current is kept to a minimum and deflection coil non-linearity and hysteresis effects associated with current flow therein are minimized.

The next step involves displacing either the red beam or the blue beam to the green dot GD1 in accordance with the prior deflection of the green electron beam in the previous step. For example, if in step 4 the green electron beam is displaced to the blue dot BD1, in the next step, step 5, the red electron beam will be similarly displaced rightward to the green dot GD1 as shown by the vector $\overrightarrow{RG}$ in FIG. 5. On the other hand, if in step 4 the green electron beam was displaced to the red dot RD1, the blue electron beam will similarly be displaced leftward to the green dot as expressed by the vector $\overrightarrow{BG}$ FIG. 6. These steps may be summarized as follows:

| Green Beam Right | or | Green Beam Not Right |
|---|---|---|
| 4. Green beam to blue dot ($\overrightarrow{GB}$). | | 4. Green beam to red dot ($\overrightarrow{GR}$). |
| 5. Red beam to green dot ($\overrightarrow{RG}$). | | 5. Blue beam to green dot ($\overrightarrow{BG}$). |

The final step, step 6, involves the deflection of the green electron beam to either a neighboring red or blue dot in a adjacent row. Displacement of the green electron beam to the dot of another color in an adjacent row is chosen to approximately minimize displacement of the green electron beam. Thus, where the green electron beam is displaced rightward to the blue dot BD1 in step 4 above, a red dot such as RD4 in an adjacent row is selected for displacement of the green electron beam as shown in FIG. 5. On the other hand, where the green electron beam is displaced leftward in step 4 to a red dot RD1, a blue dot BD2 is selected for displacement of the green electron beam as shown in FIG. 6. The latter displacement of the green electron beam to a blue dot BD2 in an adjacent row is shown as the vector $\overrightarrow{GBS}$ in FIG. 6, while the former case of displacing the green electron beam to a red dot RD4 in an adjacent row is shown as vector $\overrightarrow{GRS}$ in FIG. 5. The choice as to whether to deflect the green electron beam either upward or downward is determined by the position of the green electron beam with respect to the green dot GD1 in the absence of current flow within the deflection coil. If the green electron beam is determined to land above the green dot GD1 in the absence of deflection coil current as shown in the case of FIGS. 5 and 6, the green electron beam is deflected upward toward either the blue dot BD2 of a first adjacent phosphor dot trio or upward to the red dot RD4 in yet another adjacent phosphor dot trio. If the green electron beam is determined to be positioned below the green dot GD1, then the green electron beam is deflected downward to either the blue dot BD3 or the red dot RD5 which are in adjacent phosphor dot groups as shown in FIG. 5. The green electron beam is deflected to either BD3 or RD5 in accordance with whether the green electron beam is positioned leftward or rightward with respect to the green dot GD1. Without tabulating all the possibilities, the sixth step in the measurement procedure is listed as follows:

6. Deflect green beam to red or blue dot in an adjacent row.

The six deflection vectors thus measured are first expressed in uncalibrated horizontal and vertical deflection units. The relationship between these various vectors is graphically shown in FIG. 5, which illustrates the case of a green electron beam landing upward from and to the right of its associated green phosphor dots GD1. From FIG. 5, it can be seen that the pattern translation repeat vector $\vec{u}=(\vec{h}+\vec{v})/2$ can be expressed as:

$$\vec{u}=\overrightarrow{RG}-\overrightarrow{RR}+\overrightarrow{GRS}-\overrightarrow{GG}. \quad (3)$$

In Equation (3), the first letter in each vector identifier refers to the electron gun or beam color, while the second letter in each vector identifier refers to the target dot color. The third letter "S" refers to a skew deflection toward a dot in an adjacent row as shown in FIG. 5. The vector equation (3) is equivalent to a pair of component equations:

$$U[i]=RG[i]-RR[i]+GRS[i]-GG[i]; \; i=1,2 \quad (4)$$

where the index i refers to horizontal (x) and vertical (y) components, respectively. The equation pair (4) is readily solved for a calibration vector $\vec{c}$, since it can be shown that:

$$C[i]=U[i]/(rg[i]-rr[i]+grs[i]-gg[i]); \; i=1,2 \quad (5)$$

where the lower case notation grs refers, for example, to the expression of the green beam to red dot skew component in deflection units (grs[i]), and so on; and the calibration vector is expressed, for example, in mils per deflection unit. The calibration vector thus permits conversion from deflection coil current to electron beam displacement distance on the CRT's faceplate.

The use of the pattern repeat vector d for calibration purposes is shown in FIG. 6. In this figure, the green electron beam is shown landing on the CRT's faceplate above and to the left of its associated green phosphor dot GD1. In this case, the pattern repeat vector $\vec{d}$ can be expressed as follows:

$$\vec{d}=\overrightarrow{GG}-\overrightarrow{GBS}-\overrightarrow{BG}+\overrightarrow{BB}. \quad (6)$$

With the help of Equation (3) or Equation (5), the locations relative to the green dot at which the red and blue dots are printed on the CRT's faceplate can be deduced. Using this printing or optical grouping information, the electron-optical grouping can also be calculated. When the CRT designer does all that is feasible to correct electron-optical grouping aberrations, a redesign of the red or blue lighthouse lenses may be indicated.

Figure 8:
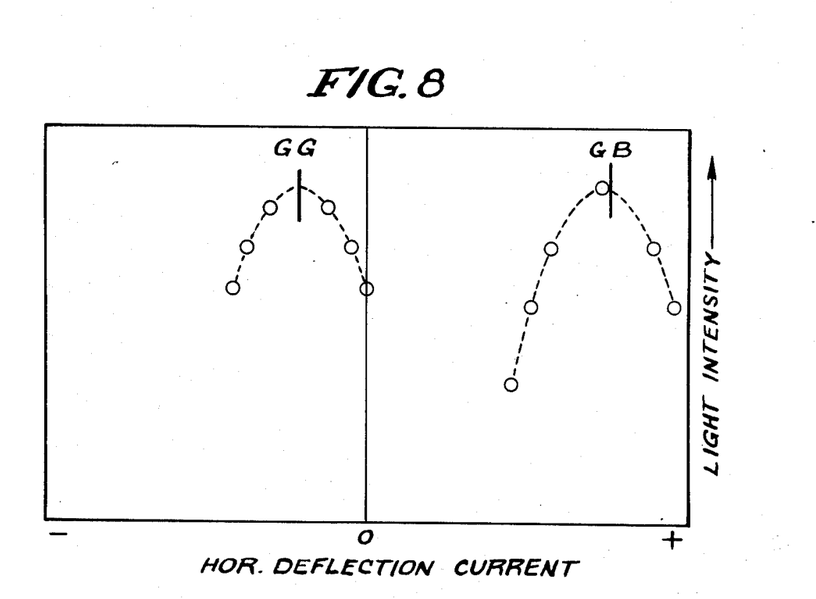
FIG. 8 illustrates a typical graphic display of CRT color purity data measured in accordance with the principles of the present invention.

Referring to FIG. 8, there is shown a graphic display of color purity measurements taken in accordance with the principles of the present invention. Plotted in FIG. 8 is light intensity (vertical) versus deflection current (horizontal). The plotted data indicates that the green electron beam landing is slightly to the right of the green phosphor dot such as would be the case illustrated in FIG. 5. FIG. 8 also shows the deflection of the green electron beam to the blue dot also as shown in FIG. 5.

There has thus been shown an up-front electron beam deflection type of method and apparatus for measuring color CRT electron beam landing or purity errors. With prior knowledge of phosphor dot pattern periodicity on the CRT's faceplate, the present invention provides a self-calibrating approach involving the measurement of landing beam error with respect to each of the three primary color phosphor dots. Measurement of a calibration vector permits deflection coil current values to be directly converted to electron beam landing position on the CRT's faceplate. Accurate measurement of CRT color purity in terms of these electron beam landing error vectors provides CRT design information for correcting and eliminating color purity errors.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a multi-electron beam color CRT having a plurality of phosphor dot trios arranged in a periodic array on a faceplate of said CRT wherein each phosphor dot trio includes a generally horizontally aligned left, a center and a right phosphor dot, with each phosphor dot emitting a respective one of the primary colors of red, green and blue when irradiated by one of said electron beams, and wherein said electron beams are responsive to current in a deflection coil in establishing the location of incidence of said electron beams on the CRT's faceplate, a method for measuring misregistration between said electron beams and said phosphor dots comprising:

measuring first, second and third vectors on the CRT's faceplate between each respective electron beam and its associated phosphor dot;

measuring a fourth vector between the center electron beam and the closer of the left or right phosphor dot to the center electron beam in a first phosphor dot trio;

measuring a fifth vector between the center phosphor dot and the electron beam not associated with the closer of the left or right phosphor dot to the center electron beam;

measuring a sixth vector between the center electron beam and the closest right phosphor dot in an adjacent second phosphor dot trio located in an immediately adjacent row when the fourth vector between the center electron beam and left phosphor dot in the first phosphor dot trio has previously been measured; or measuring a sixth vector between the center electron beam and the closest left phosphor dot in an adjacent third phosphor dot trio located in an immediately adjacent row when the fifth vector between the center electron beam and the right phosphor dot in the first phosphor dot trio has previously been measured; and calculating a calibration vector using the previously measured vectors in measuring the misregistration between said electron beams and said phosphor dots.

2. The method of claim 1 further comprising the step of measuring the sixth vector between the center electron beam and either the closest right or left phosphor dot in a second adjacent phosphor dot trio located in an immediately adjacent row above the first phosphor dot trio when the center electron beam is located above its associated center phosphor dot or measuring the sixth vector between the center electron beam and either the closest right or left phosphor dot in a second adjacent phosphor dot trio located in an immediately adjacent phosphor dot trio below the first phosphor dot trio when the center electron beam is located below its associated center phosphor dot.

3. The method of claim 2 wherein the steps of measuring each of said vectors includes measuring the illumination of a given phosphor dot as its associated electron beam is displaced toward said phosphor dot in a step-wise manner until a maximum illumination of said phosphor dot is detected.

4. The method of claim 3 wherein the step-wise displacement of an electron beam includes incrementally reducing the displacement of the electron beam with each successive step.

5. The method of claim 3 wherein the electron beam is displaced by providing a pulsed alternating current to an electromagnetic deflection coil.

6. The method of claim 5 further comprising the step of positioning said electromagnetic deflection coil immediately adjacent to the CRT's faceplate.

7. The method of claim 6 further comprising the step of positioning said electromagnetic deflection coil adjacent to various points on the CRT's faceplate in measuring electron beam misregistration over various portions of the CRT's faceplate.

8. Apparatus for measuring color purity errors in a shadow-mask type color CRT having a faceplate with a plurality of phosphor dot trios arranged in a periodic array thereon and upon which is incident a plurality of electron beams corresponding to the three primary colors of red, green and blue, said apparatus comprising:

electron beam deflection means positioned in front of the CRT's faceplate for changing the location of incidence of the electron beams upon the faceplate;

movable optical detector means positioned in front of the CRT's faceplate for detecting each of the three primary colors on a portion of the CRT's faceplate upon which the electron beams are incident;

drive means coupled to said electron beam deflection means for supplying signals to energize said electron beam deflection means for changing the location of incidence of the electron beams on the CRT's faceplate; and controller means coupled to said electron beam deflection means and to said optical detector means for displacing said electron beams with respect to each of their respective phosphor dots in a given phosphor dot trio and responsive to changes in light intensity emitted by the phosphor dots as detected by said optical detector means for measuring the color purity of each of the primary colors in the CRT.

9. The apparatus of claim 8 wherein said electron beam deflection means includes a plurality of deflection coils carrying a deflection current in an alternating manner to avoid magnetization of said deflection coils.

10. The apparatus of claim 9 wherein the alternating current is directed in said deflection coils in decreasing magnitude for degaussing said deflection coils.

11. The apparatus of claim 10 wherein the flow of current in said deflection coils is characterized by an alternating dwell time at constant current, wherein said current has a relatively long dwell time when light intensity changes are being detected and a relatively short dwell time when light intensity changes are not being detected.

12. The apparatus of claim 8 wherein said controller means includes memory means for storing information regarding the relative positions of the three primary color phosphor dots in a phosphor dot trio and the relative positions of the various phosphor dot trios.

13. The apparatus of claim 12 wherein said stored information includes a plurality of two-dimensional vectors representing the distance and direction between the three primary color phosphor dots in a phosphor dot trio and between adjacent phosphor dot trios.

14. The apparatus of claim 13 wherein said stored information further includes electron beam land error vectors for each of said primary color electron beams, wherein each of said beam landing error vectors represents the distance and direction between the location of incidence upon the CRT's faceplate of an electron beam and its associated phosphor dot.

15. The apparatus of claim 14 wherein said vectors are initially expressed in terms of units of electron beam deflection current, said apparatus further including calibration means for converting said units of electron beam deflection current to displacement distance on the CRT's faceplate.

* * * * *